United States Patent [19]

Hiestand

[11] Patent Number: 4,641,414

[45] Date of Patent: Feb. 10, 1987

[54] PALLET FOR SEATING INTERCHANGEABLE CLAMPING JAWS OF A CHUCK

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 679,759

[22] Filed: Dec. 10, 1984

[30] Foreign Application Priority Data

Dec. 13, 1983 [DE] Fed. Rep. of Germany ....... 3345012

[51] Int. Cl.$^4$ ............................................. B23Q 3/157
[52] U.S. Cl. ........................................ 29/568; 29/563; 82/2.7
[58] Field of Search .................. 29/568, 26 A, 563; 82/2.5, 2.7

[56] References Cited

U.S. PATENT DOCUMENTS

| 3,744,125 | 7/1973 | Schalles | 82/217 X |
| 4,313,252 | 2/1982 | Kuska et al. | 29/568 |
| 4,399,603 | 8/1983 | Reed | 29/568 |

FOREIGN PATENT DOCUMENTS

| 2104904 | 8/1972 | Fed. Rep. of Germany | 29/568 |
| 2805828 | 8/1979 | Fed. Rep. of Germany | 29/568 |
| 73210 | 4/1984 | Japan | 29/568 |

*Primary Examiner*—Gil Weidenfeld
*Assistant Examiner*—Glenn Webb
*Attorney, Agent, or Firm*—McGlew and Tuttle

[57] ABSTRACT

In a pallet (31) for the seating of interchangeable clamping jaws (21) lockable to base jaws (4) of a chuck (1) the clamping jaws are inserted, for their retention in radially oriented, open-faced recesses (32) of the pallet (13). In the pallet, on both sides of each recess (32) one or more clamping bolts (33) are provided, each of which is arranged so as to be movable within limits and to which a pressure can be applied. By means of the bolts, the interchangeable clamping jaws (21) can be locked in a defined position in the pallet (31) and unlocked for their removal. This makes it possible to insert the interchangeable clamping jaws (21) without problems into the recesses (32) of the pallet (31) and also to remove them from the pallet without having to guide the interchangeable clamping jaws (21) laterally and without their jamming between guide surfaces. Rather, centering and fixing of the interchangeable clamping jaws (21) takes place automatically, when they are in a predetermined end position.

21 Claims, 5 Drawing Figures

4,641,414

PALLET FOR SEATING INTERCHANGEABLE CLAMPING JAWS OF A CHUCK

FIELD AND BACKGROUND OF THE INVENTION

The present invention relates in general to tool and workpiece chucks, and in particular to a new and useful pallet for the seating of interchangeable clamping jaws which are lockable to base jaws of the chuck.

Pallets having radially oriented, openfaced recesses which receive the interchangeable clamping jaws and are mutually staggered according to the spacing of the basic jaws in the chuck body are known. A pallet of this kind is disclosed in German AS No. 21 04 904. In this reference, the recesses for receiving the interchangeable clamping jaws are formed by breakthroughs machined into the plateshaped pallet and by guide strips placed laterally next to the breakthroughs. The retention of the interchangeable clamping jaws is realized by ball detents provided at the mutually facing guide strip surfaces and, when the interchangeable clamping jaws are in plane contact with the pallet, engaging wedgeshaped longitudinal grooves provided in the pallet's side surfaces.

Since an extension of the interchangeable clamping jaws which project in the axial direction, protrude into the breakthroughs in the pallet, an extremely accurate guidance in the axial direction is necessary when inserting, as well as removing, the interchangeable clamping jaws into or from the pallet. Such accurate handling is impossible with manipulators, these pallets, despite their relatively great mechanical sophistication, are not usable for mechanized jaw changing. Above all, however, this design has the disadvantage that the pallet must be adapted to the shape of the interchangeable clamping jaws respectively to be used, and they can only be inserted into the pallet in a given clamping position. Accordingly, an appropriately designed pallet is needed for each different set of interchangeable clamping jaws. This, in turn, requires a large pallet inventory.

SUMMARY OF THE INVENTION

It is thus an object of the invention to provide a pallet for the seating of interchangeable clamping jaws of the above mentioned kind, which makes it possible to insert the interchangeable clamping jaws without problems into the recesses of the pallet, and also to remove them from the pallet without the need to guide the interchangeable clamping jaws laterally and without them jamming between the guide surfaces. Rather, the interchangeable clamping jaws should only be centered and fixed in the pallet automatically, when they are in their predetermined end position. Furthermore, the pallet design should be simple, to make for economical production. But what is to be achieved above all, is that the pallets can be used universally for all sets of interchangeable clamping jaws of a chuck, to avoid cost intensive stock keeping.

According to the invention, this is accomplished in that, in order to hold the interchangeable clamping jaws in the pallet recesses, there are inserted in the pallet, on both sides of each recess, one or more clamping bolts, each of which are movable within limits and can be acted upon by a pressure medium. By means of these clamping bolts, the interchangeable clamping jaws can be locked in the pallet in a defined position and unlocked for their removal.

In order to keep the interchangeable clamping jaws functionally safe it is expedient in this connection to provide their side surfaces with recesses in which the clamping bolts can be retained.

In order to limit the feed motion of the clamping bolts it is advisable to provide each of them with a stop surface, preferably in the form of an integral collar which interacts with a countersurface provided on the pallet or on an intermediate member inserted therein.

Furthermore, to center the interchangeable clamping jaws in the pallet recesses, the clamping bolts should be provided with a bearing surface interacting with the interchangeable clamping jaws, the distance between said bearing surface and the stop surface to be fixed so that the interchangeable clamping jaws are centered in the recesses in the end position of the clamping bolts.

To be able to remove the interchangeable clamping jaws, the clamping bolt ends engaging the interchangeable clamping jaws and the interchangeable clamping jaw recesses respectively receiving the clamping bolts should be wedge-shaped, preferably coneshaped. This makes it possible for the wedge surfaces in mutual contact to push back the clamping bolts, the wedge surfaces provided at the clamping bolt ends forming the bearing surfaces.

According to a different embodiment it is also possible, however, to provide the clamping bolts with a collar for support on the interchangeable clamping jaws when the interchangeable clamping jaws recesses receiving the clamping bolt ends are designed as cylindrical holes. In this case, the collar forms the bearing surface, and also, when removing the interchangeable clamping jaws, the clamping bolts are pushed back separately.

It is expedient, moreover, to guide the interchangeable clamping jaws in the pallet recesses with lateral clearance and to design the pallet recesses as open through-recesses with smooth surfaces. This makes the maching of the recesses particularly economical and facilitates the equipping of the pallet with interchangeable clamping jaws.

The intermediate members for receiving the clamping bolts should be designed, in a simple embodiment, as bushings which are inserted in the pallet and have a stepped seating hole. In this connection, it is advisable to arrange the bushings so as to be adjustable in the axial direction, preferably to screw them into a tapped hole machined into the pallet so as to make the location of the stop surfaces readily changeable and thus adjustable.

The clamping bolts may be acted upon by the force of one or more compression springs each supported by the pallet, but also possible to provide on the clamping bolt end away from the interchangeable clamping jaws, an actuating piston to which a pressure medium can be applied so as to provide a power actuated feed, it being possible to adjust the actuating force readily and to eliminate it for the removal of the interchangeable clamping jaws. In this embodiment it is further advisable to preload the clamping bolts by means of a spring acting upon them in the direction of the interchangeable clamping jaws.

According to a further development, the clamping bolts may also be produced, on their end away from the interchangeable clamping jaws, with an actuating piston to which a pressure medium can be applied in both directions so as to control their infeed and return.

The retention of the interchangeable clamping jaws is particularly safe and reliable if two mutually flush clamping bolts which are juxtaposed in the radial direction and which act prependicularly upon the axis of the interchangeable clamping jaws, are disposed on each side of a recess.

It is further advantageous to provide, in the pallet recesses, exchangeable inserts extending in the axial direction for the seating of interchangeable clamping jaws of different height dimensions.

To lock the interchangeable clamping jaws in a coupled position it is advisable, furthermore, to provide the basic jaws with an axially adjustable spring detent and the interchangeable clamping jaws with a seating hole interacting the detente and being engaged by detent pins of the spring detents when the interchangeable clamping jaws are locked to the basic jaws.

To actuate the detent pins of the spring detents when unlocking the interchangeable clamping jaws, there should also be provided on the pallet, unlocking bolts which engage the seating holes of the interchangeable clamping jaws and which may each have, as insert, an integral, preferably polygonal collar.

To chuck the pallet in a feeding device such as a manipulator, it is advisable to provide the pallet, on its side opposite the recesses, with a shoulder projecting in the axial direction, with seating holes, or the like. If the shoulder diameter is chosen in accordance with the diameter of the workpiece to be machined, the latter can be gripped by the manipulator and inserted into the chuck without the necessity of readjusting the manipulator.

To make it possible to suspend the pallet, e.g. in a magazine, it should have suspension holes machined into its face, preferably disposed between the recesses and provided with an undercut.

The interchangeable clamping jaws, insertable into the pallet, may each be assembled of a cassette in whose side surfaces the recesses for the seating of the clamping bolts are provided, and of a clamping insert which is exchangeable joined to the cassette at its radially inner and/or outer faces. This makes it possible to provide quickly interchangeable clamping jaw sets for different workpiece diameters by exchanging the clamping inserts.

The pallet for the seating of interchangeable clamping jaws, designed according to the invention, is not only of very simple structural design, and, hence, economically producible without difficulties, it also makes possible a rapid. trouble-free change of interchangeable clamping jaws in a chuck. This is because if clamping bolts movable within limits and acted upon by a pressure medium to make the interchangeable clamping jaws lockable in a defined position and unlockable for their removal are provided for the retention of the interchangeable locking jaws in the pallet recesses, it is possible to make the recesses appropriately large so that no jamming occurs either when inserting the interchangeable clamping jaws in the pallet recesses or when removing them therefrom. And yet there is assurance that the interchangeable clamping jaws are always reliably retaind in a predetermined position in which their coupling to the basic jaws of the chuck can be accomplished without problems.

It is also of advantage that interchangeable clamping jaws of different design can be fed to a chuck by means of one pallet design. Only the seat for the clamping bolts must be must be of the same design on different interchangeable clamping jaws to retain them in the pallet recesses. Therefore, if the coupling members will allow, interchanghangeable clamping jaws may be used for both inside and outside clamping. And since centering of the interchangeable clamping jaws occurs automatically only in the end position by means of the clamping bolts, equipping a pallet and feed it it to a chuck is possible also by means of manipulators.

Accordingly, an object of the present invention is to provide a pallet for the seating of interchangeable clamping jaws which are lockable to a base or basic draw of a chuck, when the pallet has radially oriented, open faced recesses for receiving the interchangeable clamping jaws and are mutually staggered according to the spacing of the basic jaws on the chuck body, characterized in that in order to hold the interchangeable clamping jaws in the recesses of the pallet, one or more clamping bolts are inserted on both sides of each recess with each clamping bolt arranged so as to be movable within limits and capable of being acted upon by a pressure medium. By means of the bolts, the interchangeable jaws can be locked in the pallet in a defined position and unlocked from the pallet for their removal.

A further object of the invention is to provide a pallet which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
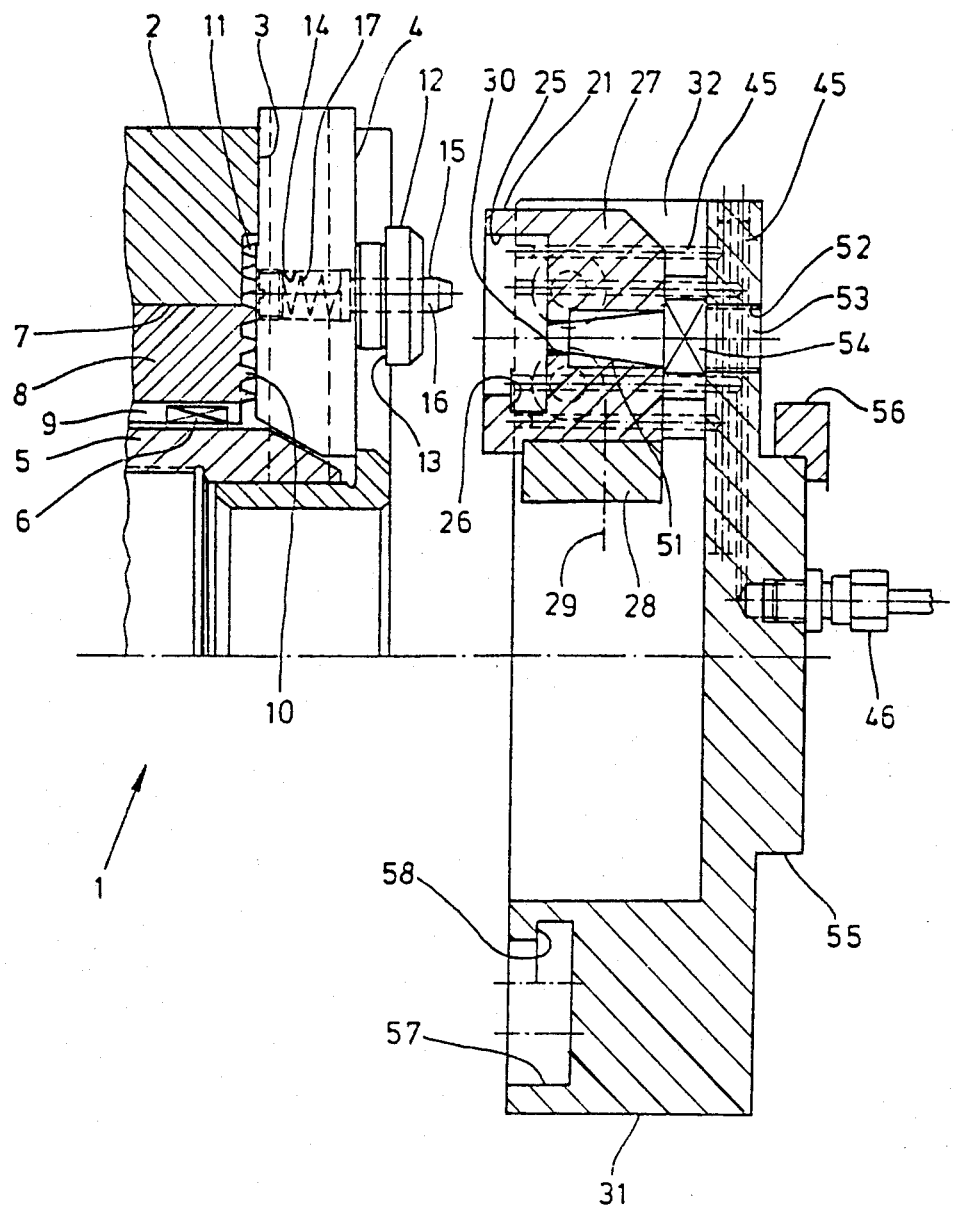
FIG. 1 is an axial sectional view of a pallet according to the invention with an associated chuck, equipped with interchangeable clamping jaws.

The chuck shown in FIG. 1 and designated 1, contains several, preferably three, basic or base jaws 4 which are evenly distributed over the circumference of the chuck body 2, movably guided in radially oriented grooves 3 and drivable by a central actuating member 5 via tapered rods 8. For this purpose, the tapered rods 8, inserted in tangentially oriented recesses 7 and the chuck body 2, are each provided with a tapered slot 9 engaged by integral protrusions 6 of the actuating member 5, and with teeth 10 meshing with teeth 11 machined on the basic jaws 4. Since the tapered slots 9 and the protrusions 6 are inclined in the axial direction, an axial motion of the actuating member 5 is thus transformed into a radial motion of the basic jaws 4.

To be able to attach, in a simple manner, interchangeable clamping jaws 21 to the basic jaws 4 there is formed on each basic jaw 4 a mushroom-like extension 12 which is provided with an undercut 13. The interchangeable clamping jaws 21 each have a recess 25 to accommodate the extension 12, this recess 25 also have an undercut 26. The cylindrically designed extension 12 thus engages the undercut 26 when the interchangeable clamping jaws 21 are placed on the basic jaws 4 so that they are reliably supported by a cresentshaped surface.

Figure 4:
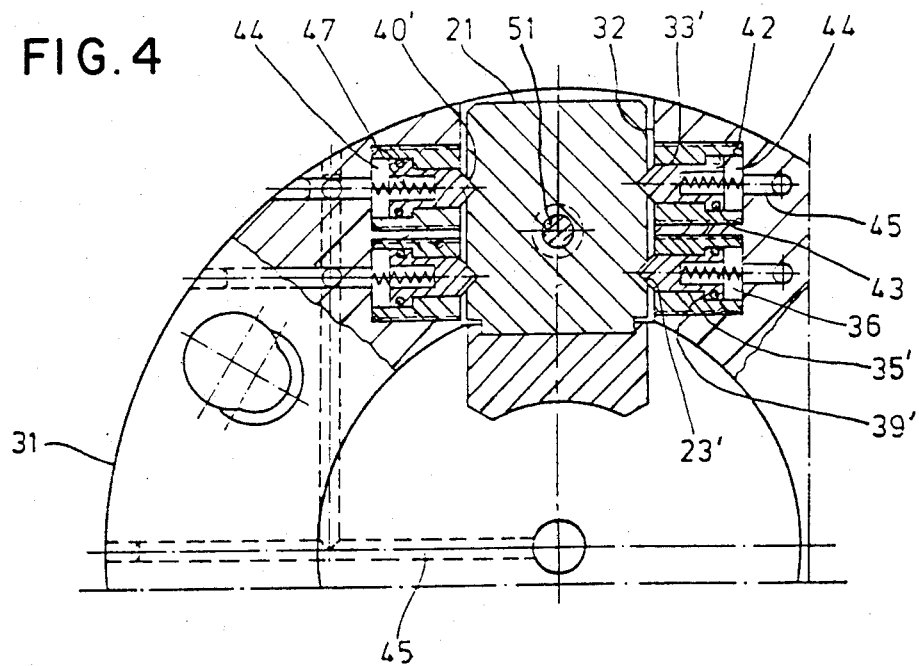
FIGS. 4 and 5 are front views and partially in section, of the pallet according to FIG. 1 with differently designed clamping bolts.
Figure 5:
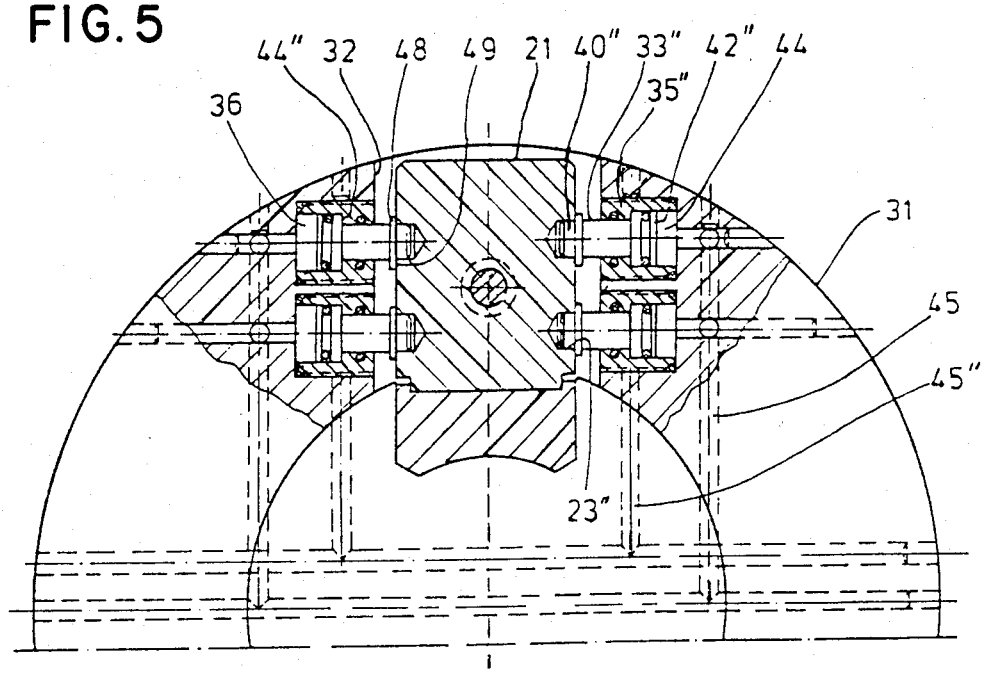

To be able to feed the interchangeable clamping jaws 21 mechanically to the chuck 1 by means of a feeding device 56, a manipulator, or in another way, a pallet 31 is provided in which the interchangeable clamping jaws 21 are retained. For this purpose, the pallet 31 is provided with radially oriented recesses 32 disposed according to the spacing of the basic jaws 4 of the chuck, 1, in which recesses the interchangeable clamping jaws 21 are clamped by means of clamping bolts 33 (FIG. 2) which act upon them perpendicular to their axis and which are of different designs according to the embodiments of the invention. In FIGS. 4 and 5 the bolts are designated 33' and 33", respectively. The interchangeable clamping jaws 21 as shown in FIGS. 2, 3, 4 and 5, are centered in the amply dimensioned recesses 32 by the clamping bolts 33, 33', or 33", engaging recesses 23, 23' or 23", respectively, machined into the side surfaces 22 of the interchangeable clamping jaws 21.

Each recess 32 in pallet 31 has a floor and each jaw 21 is spaced from the floor. The jaw is supported by an unlocking bolt 51 which holds the jaw in its spaced position above the floor of its recess 32.

Figure 2:
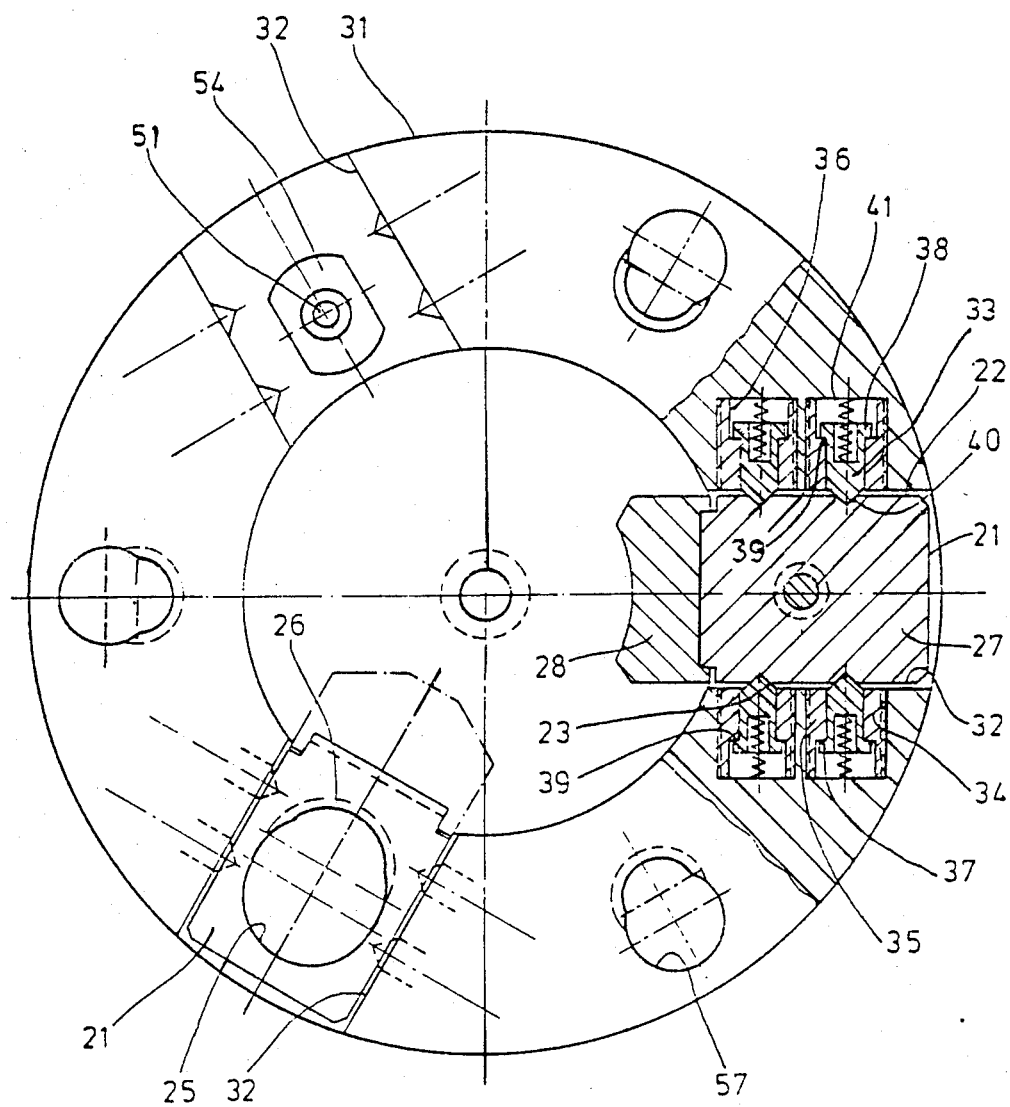
FIG. 2 is a front elevational view partially in section of a pallet according to FIG. 1.

To be able to accomplish this, the clamping bolts 33, 33', 33", each acted upon by a pressure medium, are arranged so as to be movable within limits in the direction of the interchangeable clamping jaws 21, and they can make a joint contact with the latter only in one defined position. For this purpose, the clamping bolts 33, 33', of FIG. 2 and 4 are provided with a stop surface 39, 39' formed by an integral collar 38 an an actuating piston 42, respectively, as well as with bearing surfaces created by their wedge or coneshaped points 40, 40'. Stop surfaces 39 interacts with countersurface 37 and point 40 with the interchangeable clamping jaws 21. A similar countersurface is provided in FIG. 4. The distance between the stop surfaces 39, 39' and the contact with the interchangeable clamping jaws 21 is selected so that the interchangeable clamping jaws 21 are retained contrally in the recesses 32 in the end position of the clamping bolts 33, 33'.

The clamping bolts 33, 33', 33" of FIGS. 2, 4 and 5 are each inserted in bushings 35, 35' and 35" respectively which are screwed into tapped holes 34, 34' and 34" machined into the pallet 31 of each embodiment and provided with stepped seating holes 36. This not only provides the countersurfaces, e.g. 37, but their location can also readily be changed in case of need.

In the embodiment according to FIG. 2, the clamping bolts 33 are acted upon by the force of pressure means in the form of a compression spring 41 supported against the pallet 31. But according to FIG. 4, an actuating piston 42 to which a pressure medium can be admitted unilaterally may also be provided on the clamping bolts 33' to be able to clamp the interchangeable clamping jaws 21. All this requires is the insertion of a seal 43 in the integral collar and the supply of a pressure medium to the thus created pressure chamber 44 via channels 45 to be connected to a pressure medium source by means of a connecting nipple 46 (FIG. 1). The clamping bolts 33' ar slightly preloaded by a spring 47 so that clamping is possible also without the supply of pressure medium.

In the embodiment according to FIG. 5, the ends 40" of the clamping bolts 33" are of cylindrical design, and they engage the recesses 23" of the interchangeable clamping jaws 31 from the recesses 32. The clamping bolts 33" are equipped with an actuating piston 42" to which pressure medium can be admitted in both directions and with which the pressure chambers 44 and 44" are associated and to which the pressure medium supply channels 45 and 45" are connected. In this embodiment, the bearing surfaces 49 interacting with the interchangeable clamping jaws 21 are formed by collars 48 provided on the clamping bolts 33" acting on surfaces 49 of the jaws 21.

To equip the chuck 1 of FIG. 1, with the interchangeable clamping jaws 21 retained in the pallet 31, the pallet is to be moved to the left so that the extensions 12 machined on the base or basic jaws 4 are introduced into the recesses 25 of the interchangeable clamping jaws 21. The interchangeable clamping jaws 21, equipped with a pilot bevel (shown in FIG. 3) then partly engage the slots 3 of the chuck body 2, thus guiding them laterally. During this feeding motion, detent pins 16 of a spring detent 15 inserted in a hole 14 in the basic jaws 4 are being pushed inwardly against the force of a spring 17. As soon as the faces of the extensions 12 contact the base of the recess 25 of the interchangeable clamping jaws 21, the basic jaws 4 are moved inwardly by means of the actuating member 5 so that the extensions 12 snap into the undercuts 26, thereby locking the interchangeable clamping jaws 21 firmly to the basic jaws 4 because the detent pin 16 of the spring detent 15 is being pushed by the force of the spring 17 into a seating hole 30 machined into the interchangeable clamping jaws 21. The pallet 31 can be released from the interchangeable clamping jaws 21 by an axial motion. An unlocking bolt 51 is in each hole 30 when jaws 21 are in pallet 31, but leaves the hole when the jaw is removed from the pallet to allow pin 16 to enter and lock the jaw in place.

Because the points 40 of the clamping bolts 33, 33' and the recesses 23 of the interchangeable clamping jaws 21 accommodating them are coneshaped, the clamping bolts 33 and 33', respectively, are automatically pushed back by the motion of the pallet 31 against the force of the springs 41 and 47, respectively, acting upon them. It goes without saying that in the embodiment according to FIG. 4 the pressure chambers 44 must be vented, if applicable. On the other hand, in the embodiment according to FIG. 5, pressure medium must be fed to the pressure chambers 44" with the pressure chambers 44 vented, to pull the clamping bolts 33" out of the recesses 23".

Figure 3:
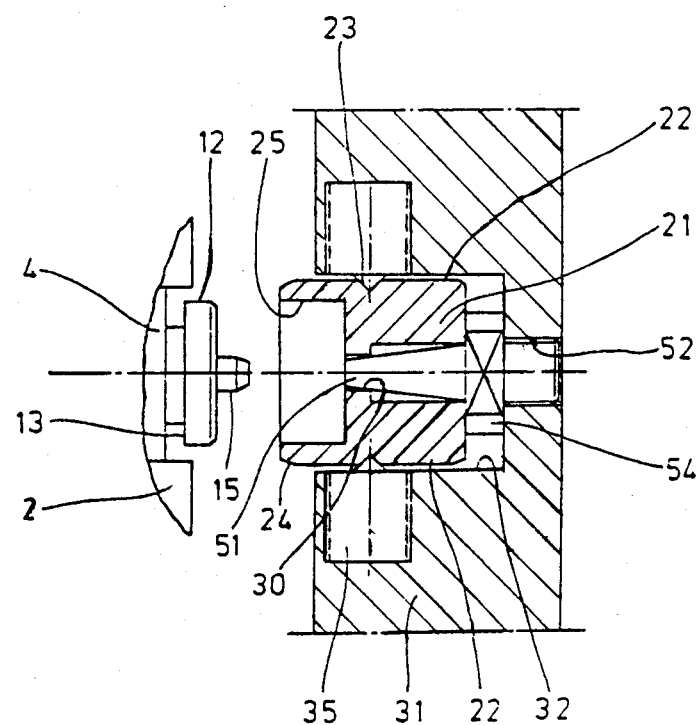
FIG. 3 is a partial top view of the arrangement according to FIG. 1, partly in section.

To remove the interchangeable clamping jaws 21 attached to the basic jaws 4 from the pallet 31 again, the pallet should be moved to the left in the direction of the chuck 1, as shown in FIGS. 1 and 3, so that the clamping bolts (33, 33', and 33"), respectively, engage the recesses machined into the side surfaces 22 of the interchangeable clamping jaws 21. During this motion the detent pins 16 of the spring detents 15 are agains pushed back by unlocking bolts 51 provided on the pallet 31 and projecting into the seating hole 30 so that the interchangeable clamping jaws 21 are unlocked by an outward actuating motion of the basic jaws 4. It goes without saying that in the embodiment examples according to FIGS. 4 and 5, the pressure medium supply must be controlled accordingly.

According to the above, the attachment of the interchangeable clamping jaws 21 to the basic jaws 4 and their removal can be accomplished by means of the pallet 31 mechanically in short order without difficulties and without the occurrence of jamming in the sufficiently wide recesses 32.

In the embodiment example shown, the interchangeable clamping jaws 21 are each assembled of a cassette 27 and a clamping insert 28, joined together by means of screw 29. By exhanging the clamping inserts 28 which may be mounted to the outer faces of the cassette 27 it is thus easy to provide interchangeable clamping jaw sets for workpieces of different diameters.

The unlocking bolts 51 are screwed into tapped holes 52 of the pallet 31 by means of threaded sections 53 and provided with a polygonal collar 54 disposed as an insert in the recesses 32. Through the height of the collar 54 with which the interchangeable clamping jaws 21 are in areal contact it is thus possible to equalize different interchangeable clamping jaw heights by exchanging the unlocking bolts 51.

To make it easy to transport the pallet 31 by the feeding device 56, there is further machined, on the face opposite the recesses 32, an axially projecting shoulder 55 for the feeding device 56 to engage. If the diameter of the shoulder 55 is approximately of the same size as the workpieces to be chuckded by means of the interchangeable clamping jaws inserted in a pallet 31, no adjustment is needed when feeding them in by means of other actuating members engaging seating holes 57 provided with undercuts 58 and disposed between the recesses 32.

While specific embodiments of the invention have been shown and described in detail to illustrate the application of the principles of the invention, it will be understood that the invention may be embodied otherwise without departing from such principles.

What is claimed is:

1. A pallet assembly for seating interchangeable clamping jaws on base jaws distributed in a pattern on a chuck, with each base jaw having an axially movable spring detent, comprising:

a pallet having a plurality of radially extending open-faced recesses distributed in the pattern of the base jaws, each recess being bounded by a floor of said pallet;

a clamping jaw disposed in each open-faced recess, said jaw being spaced above said floor, each radially extending open-faced recess being wider in a circumferential direction than a clamping jaw disposed therein for guiding each clamping jaw with lateral clearance;

a plurality of clamping bolts on each side of each recess for entering each recess and engaging a clamping jaw in a respective recess, each clamping bolt mounted for movement with a selected limit to said pallet for movement in one of said open-faced recesses to engage and disengage a clamping jaw therein;

pressure means associated with said pallet and with each clamping bolt for biasing each clamping bolt into engagement with a respective clamping jaw to hold the respective clamping jaw in its open-faced recess;

each clamping jaw having a seating hole for receiving one of the spring detents of a base jaw and for locking the clamping jaw to the base jaw when the clamping jaw is removed from said pallet; and an unlocking bolt fixed in each open-faced recess and extending axially into said seating hole of a clamping jaw in said open-faced recess, each unlocking bolt engageable with a spring detent for dislodging the spring detent from a seating hole to permit unlocking of the clamping jaw from a base jaw, each unlocking bolt having a collar engaged on said floor and against which the clamping jaw for said unlocking bolt is engaged for supporting the clamping jaw axially spaced from said floor.

2. A pallet assembly according to claim 1, wherein each clamping jaw has a surface recess for engagement by one of said clamping bolts for retaining said clamping jaw in its open-faced recess.

3. A pallet assembly according to claim 1, wherein each clamping bolt has a collar, said pallet having a countersurface for engaging each collar to define one end of said selected limit.

4. A pallet assembly according to claim 3, wherein each clamping jaw has a surface recess for receiving each clamping bolt movable into the open-faced recess in which the clamping jaw is disposed, each clamping jaw having an end engaged in each surface recess, said end engaging in said clamping jaw surface recess defining an opposite end of said selected limit, a distance between said end of each clamping bolt and its collar being fixed.

5. A pallet assembly according to claim 1, wherein said end of each clamping bolt is wedge shaped.

6. A pallet assembly according to claim 4, wherein said end of each clamping bolt is coneshaped.

7. A pallet assembly according to claim 6, wherein each surface recess of each clamping jaw is coneshaped.

8. A pallet assembly according to claim 4, wherein each surface recess of each clamping jaw has a cylindrical portion, said end of each clamping bolt having a cylindrical portion engageable in said cylindrical portion of each surface recess respectively, and a stop collar engaged around each clamping bolt adjacent its cylindrical portion for engaging a clamping jaw and for defining the other end of said selected limit.

9. A pallet assembly according to claim 1, wherein two clamping bolts are movably mounted on each side of each open faced recess, each clamping bolt having a coneshaped end, each clamping jaw having a pair of coneshaped recesses on each side thereof for engaging each pair of clamping bolt ends, each clamping bolt having a collar defining a stop, said pallet having a counter surface for engaging each stop to define one end of said selected limit, said end of each clamping bolt engaged in a surface recess of a clamping jaw defining an opposite end of said selected limit.

10. A pallet assembly according to claim 1, wherein each radially extending open-faced recess has smooth surfaces extending radially entirely through said pallet.

11. A pallet assembly according to claim 1, including a bushing mounted in said pallel for each clamping bolt, each bushing having an opening for movably receiving each clamping bolt for movement within its selected limit, each clamping bolt having a stop surface, each bushing having a countersurface engaged with said stop surface for defining one end of said selected limit, an opposite end of said selected limit being defined by each clamping bolt when it is engaged with a respective clamping jaw.

12. A pallet assembly according to claim 11, wherein each bushing is threadably engaged in said pallet and being adjustable in a direction toward and away an adjacent open-faced recess for repositioning said selected limit of movement for a clamping bolt in said bushing.

13. A pallet assembly according to claim 1, wherein said pressure means comprises a spring engaged between each clamping bolt and said pallet for biasing each clamping bolt into each respective open-faced recess.

14. A pallet assembly according to claim 1, wherein said pressure means comprises a piston defined on each clamping bolt and movable in a cylinder defined in said pallet and passage means in said pallet communicating with said cylinder for conducting pressure fluid to said piston to move said piston in a direction into its respective open-faced recess.

15. A pallet assembly according to claim 14, including a spring engaged between each piston and said pallet for biasing each clamping bolt in a direction into its respective open-faced recess.

16. A pallet assembly according to claim 14, wherein said pallet includes second passage means communicating with a portion of each cylinder on a side of each piston adjacent its respective open-faced recess for receiving pressure fluid to move each clamping bolt in a direction away from its respective open faced recess.

17. A pallet assembly according to claim 16, wherein each clamping bolt has an end for engagement with a respective clamping jaw which has a cylindrical portion, each clamping jaw having a surface recess with a cylindrical portion for receiving a cylindrical portion of a respective clamping bolt, and a stop collar engaged around each clamping bolt adjacent its cylindrical portion for engagement against a respective clamping jaw to define one end of said selected limit.

18. A pallet assembly according to claim 1, including a pair of clamping bolts on each side of each open-faced recess spaced radially from each other with respect to said pallet, each movable perpendicularly to a radial axis of a respective clamping jaw.

19. A pallet assembly according to claim 1, including an insert fixed in each open-faced recess and extending radially with respect to said pallet, said clamping jaw in each recess engaged against a respective insert for defining an axial position of each clamping jaw.

20. A pallet assembly according to claimi 1, wherein each collar comprises a polygonal collar of each unlocking bolt respectively, each unlocking bolt being threaded into said pallet and being rotatable to adjust an axial position thereof with respect to said pallet.

21. A pallet assembly according to claim 1, including a plurality of openings on the side of said pallet containing said open-faced recesses and spaced from said open-faced recesses for facilitating moving of said pallet.

* * * * *